United States Patent [19]
Gundt

[11] Patent Number: 6,045,845
[45] Date of Patent: Apr. 4, 2000

[54] OXYGEN ATMOSPHERE PACKAGING OF MEAT

[75] Inventor: Dieter Gundt, Borgholzhausen, Germany

[73] Assignee: PurePulse Technologies, Inc., San Diego, Calif.

[21] Appl. No.: 08/894,271

[22] PCT Filed: Feb. 15, 1996

[86] PCT No.: PCT/IB96/00130

§ 371 Date: Dec. 31, 1997

§ 102(e) Date: Dec. 31, 1997

[87] PCT Pub. No.: WO96/25048

PCT Pub. Date: Aug. 22, 1996

[30] Foreign Application Priority Data

Feb. 16, 1995 [SE] Sweden ................................. 9500572

[51] Int. Cl.⁷ ........................... A23L 3/3418; A23L 3/26; B65B 31/02
[52] U.S. Cl. .......................... 426/316; 426/129; 426/263; 426/264; 426/410; 426/415; 426/418; 426/234; 426/248
[58] Field of Search ..................... 426/129, 312, 426/316, 263, 264, 265, 410, 415, 418, 234, 248

[56] References Cited

U.S. PATENT DOCUMENTS

| | | |
|---|---|---|
| 2,072,416 | 3/1937 | Berndt et al. . |
| 2,072,417 | 3/1937 | Berndt et al. . |
| 2,482,507 | 9/1949 | Rentschler et al. . |
| 2,930,706 | 3/1960 | Moulton . |
| 3,003,884 | 10/1961 | Andrews ................................. 426/129 |
| 3,029,149 | 4/1962 | De Long ................................. 426/129 |
| 3,047,404 | 7/1962 | Vaughan ................................. 426/129 |
| 3,670,874 | 6/1972 | Brunner . |
| 3,713,849 | 1/1973 | Grindod et al. . |
| 3,814,680 | 6/1974 | Wood ........................................ 210/64 |
| 3,817,703 | 6/1974 | Atwood . |
| 3,934,044 | 1/1976 | Busch et al. ............................ 426/326 |
| 3,955,921 | 5/1976 | Tensmeyer . |
| 4,035,981 | 7/1977 | Braun et al. . |
| 4,042,325 | 8/1977 | Tensmeyer . |
| 4,265,747 | 5/1981 | Copa et al. .............................. 210/758 |
| 4,391,080 | 7/1983 | Brody et al. .............................. 53/426 |
| 4,396,582 | 8/1983 | Kodera .................................... 422/300 |
| 4,424,188 | 1/1984 | DiGeronimo ............................. 422/20 |
| 4,464,336 | 8/1984 | Hiramoto ................................. 422/24 |
| 4,494,357 | 1/1985 | DiGeronimo ............................. 53/167 |
| 4,548,852 | 10/1985 | Mitchell ................................. 426/129 |
| 4,642,239 | 2/1987 | Ferrar et al. ........................... 426/129 |
| 4,792,455 | 12/1988 | Tallafus . |
| 4,800,090 | 1/1989 | August .................................... 426/248 |
| 4,871,559 | 10/1989 | Dunn et al. ............................. 426/248 |
| 4,910,942 | 3/1990 | Dunn et al. ............................... 53/425 |
| 4,983,411 | 1/1991 | Tanaka et al. .......................... 426/248 |
| 5,034,235 | 7/1991 | Dunn et al. ............................. 426/238 |
| 5,489,442 | 2/1996 | Dunn et al. ............................. 426/248 |

FOREIGN PATENT DOCUMENTS

| | | |
|---|---|---|
| 0287480 | 10/1988 | European Pat. Off. . |
| 0328245 | 8/1989 | European Pat. Off. . |
| 0690012 | 1/1996 | European Pat. Off. . |
| 2290153 | 6/1976 | France ................................... 426/418 |
| 60-102157 | 6/1985 | Japan ..................................... 426/248 |
| 4-267771 | 9/1992 | Japan ..................................... 426/129 |
| 7502834 | 3/1975 | Netherlands . |
| 521189 | 5/1940 | United Kingdom .................. 426/248 |
| 754336 | 8/1956 | United Kingdom . |
| 1052513 | 12/1963 | United Kingdom . |
| 1186978 | 4/1970 | United Kingdom .................. 426/129 |
| 1199998 | 7/1970 | United Kingdom . |
| 1346521 | 2/1974 | United Kingdom . |
| 1448411 | 9/1976 | United Kingdom . |
| 1548997 | 7/1979 | United Kingdom . |
| 1581998 | 12/1980 | United Kingdom . |
| 2026841 | 2/1987 | United Kingdom . |

OTHER PUBLICATIONS

J. of Food Protection, vol. 51, May 1988, pp. 356–360, copy in 426/129.
Fleischwirtsch 60(8),1980, pp. 1513–1517, copy in 426/129.
J. of Food Technology 10, 339–347 copy in 426/129, 1975.
J. of Food Technology 8, 453–461 copy in 426/129, 1973.
J. of Food Science vol. 36, 1971, pp. 1011–1014 copy in 426/129.
Food Packaging, Sacharon, 1970, Avipuol. pp. 96–99 copy in 426/129.
Food Technology, pp. 194–196 copy in 426/129, Apr. 1955.
Journal of Food Protection, vol. 42, No. 4, pp. 317–322 (Seideman et al), Apr. 1979.
Journal of Food Protection, vol. 42, No. 4, pp. 323–327 (Christopher et al), Apr. 1979.
Derwent Abstract No. AN 93–070786; London, GB; XP002008890 & JPA05016973 (ASAHI Chem Ind.), Jan. 26, 1993 (JAP 5016973).
Johnson, "Flashblast—the light that cleans", *Popular Science*, pp. 82–84.
Rentschler, et al., "Bactericidal Effect of Ultraviolet Radiation", Research Department, Westinghouse Lamp Division, Bloomfield, New Jersey, pp. 745–774.

*Primary Examiner*—Steven Weinstein
*Attorney, Agent, or Firm*—Fitch, Even, Tabin & Flannery

[57] ABSTRACT

A method of extended shelf life packing of a food, wherein the food comprises meat, consists of the step of packaging the food by sealing the food in a non-barrier, oxygen permeable, flexible package. The package comprises plastic film and the atmosphere sealed within the package is pure oxygen (100% $O_2$). The plastic film may comprise polyethylene film or low density polyethylene film.

7 Claims, No Drawings

OXYGEN ATMOSPHERE PACKAGING OF MEAT

TECHNICAL FIELD

The present invention relates to a method of extended shelf life packing of a food, in particular meat, in a flexible plastic package. The present invention also relates to a plastic package containing food of extended shelf life.

BACKGROUND ART

Foods, for example meat and meat products, are normally packed in finished consumer packages, in which instance the packaging operation of the food takes place either centrally for outward distribution of the consumer packages to supermarkets and other retail outlets, or locally on site at a point of sale.

Irrespective of whether the food is packed centrally in the chain of distribution or locally at the point of sale, it is of critical importance that the package and its subsequent handling and storage of the packed food take place under such conditions and employing such methods that the packed food is given the very best possibility of reaching the consumer in pristine condition and freshness.

The rational distribution of foods on a large scale requires that the packaging operation and subsequent package handling be both simple and convenient, and obviously cost-effective as well, so as not to burden unnecessarily distribution economy. These taco requirements are contradictory inasmuch as pristine condition and freshness (so-called extended shelf life) generally require product-specific consumer packages and packaging environments, with inevitably higher costs per produced consumer package as a result, while simplicity and convenience in distribution generally presuppose standardized consumer packages from easily produced and readily available packaging materials which, while keeping distribution costs down, largely result in a deterioration in product protection properties in the produced consumer package.

For example, the packing of particularly oxygen gas sensitive and perishable foods, such as fresh meat takes place in that cut or sliced pieces of the meat are placed in suitable portions in correspondingly dimensioned plastic trays which, after filling at normal ambient atmospheric conditions, are closed by means of a thin plastic film which is applied over the filled plastic tray and is wrapped around the bottom edges of the tray and secured against the bottom of the tray for enveloping the tray and its contents. This conventional packing technique employing plastic trays is circumstantial in that it requires separate equipment for handling the pre-formed plastic trays and the thin plastic film, respectively. A further factor that renders this particular technique less convenient and attractive is that different types of foods generally require pre-formed plastic trays of different dimensions and geometric outer configurations. A further drawback in this context relates to the enveloping plastic film which must be adapted such that, at least for a certain guaranteed shelf life for the food in question, it ensures that the enveloped packaging atmosphere is not injuriously affected in respect of the packed food as a result of the migration or transport of gas through the plastic film. Consequently, plastic films of polyethylene and similar readily available polymer materials are not employed, since these generally lack the requisite gas barrier properties to afford the desired product protection for the packed food.

It is also known in the art to pack cut or sliced meat and similar foods under vacuum in flexible plastic packages. In order to give the finished package the desired combination of mechanical and physical protective properties, the material in these prior art plastic packages is constructed from a plurality of mutually bonded layers of the same or different materials (so-called multilayer materials) which, together in union, give the package the desired combination of protective properties. A packaging material of the multilayer type for vacuum packing of foods must possess particularly good gas barrier properties in order to maintain the vacuum inside the finished package during the guaranteed shelf life of the packed food, and thus requires that at least some of the material layers included in the packaging material consist of such a specifically gas-tight polymer, which is often extremely expensive. A multilayer material of the type under consideration here often requires interjacent material layers of chemical binder or adhesive in order to bond together the individual material layers with superior and lasting bonding strength, to form a well-integrated packaging material.

According to yet a further known packaging technique, fresh meat is packed in a modified atmosphere in a package consisting of a multilayer barrier film. This so-called MAP technique (modified atmosphere packaging) is very similar to the above-described vacuum packaging technique, but differs from it principally in that the packaging atmosphere, instead of a vacuum, consists of a mixture of gases specifically composed to suit the product which is to be packed, such as $O_2$, $N_2$, $CO_2$. The packaging atmosphere is composed such that the packed product (fresh meat) is given the desired shelf life, at the same time as the product (in particular when the packed meat is beef) must retain its consumer-attractive pristine, fresh appearance throughout its entire shelf life. In order to achieve and maintain the best possible MAP conditions within the package, this packaging technique requires the employment of at least one material layer of a barrier film (for example polyamide/polyethylene) in the multilayer structure of the packaging material. As has already been mentioned in connection with the vacuum packaging technique above, a packaging material of the multilayer type is complicated and, in addition expensive, in particular when it involves a material layer of a barrier film. The MAP packaging technique further suffers from the drawback that the packaging atmosphere, or gas mixture, which is required to achieve the desired shelf life and quality targets for the product necessitates careful product-adapted regulation and monitoring throughout the entire packaging process.

OBJECTS OF THE INVENTION

One object of the present invention is, therefore, to propose a novel and improved method of the type described by way of introduction for the superior shelf life packaging of a food without the accompanying drawbacks and problems of the type described in the foregoing in connection with an account of the prior art.

A further object of the present invention is to realize a method of packing a food with good shelf life, in particular fresh meat, in a package of plastic which is neither constructed according to the multilayer principle nor involves a material layer of expensive barrier film.

Yet a further object of the present invention is to realize a method of packing a food with good shelf life, in particular fresh meat, in a package consisting of a readily available, economical packaging material of the single layer type.

SOLUTION

These and other objects will be attained according to the present invention by means of a method of the type disclosed by way of introduction which has been given the characterizing feature that the food is packed in an oxygen gas atmosphere.

OUTLINE OF THE INVENTION

Practical experiments, according to the present invention, have shown that a food, for example fresh meat, which is packed in an oxygen gas atmosphere (100 percent $O_2$) retains its pristine condition and freshness for a considerably longer time than a food which is packed in a corresponding manner in normal atmospheric conditions, but otherwise during identical packing and storage times. It is known that certain properties in foods, such as flavour, colour and surface properties in general, are sensitive to variations in the oxygen gas concentration of the ambient packaging atmosphere, and that these properties rapidly deteriorate if the oxygen gas concentration falls below a certain critical minimum level. At the same time, it is known that the preconditions for the packed food to retain its pristine freshness substantially unchanged, improve in oxygen gas concentrations above this critical level. One explanation, which however lays no claim to being linked to any specific scientific theory, for the favourable shelf life results which have been observed in the experiments according to the invention may thus be that the oxygen gas concentration in the packaging atmosphere remained at a level or within a concentration range which, throughout the entire experiment period, kept above the critical minimum level. What was quite surprising however was that such favourable shelf life results were also achieved in such experiments which were carried out employing a plastic package which is not known for possessing superior gas barrier properties, but which, on the contrary, is known to have poor or defective tightness properties vis-a-vis gases, in particular oxygen gas, and which therefore had not previously been taken into consideration for use in such contexts. One example of such a plastic possessing recognized defective gas tightness properties is polyethylene, such as LDPE (low density polyethylene).

According to one preferred embodiment of the present invention, the food is thus packed in a package of polyethylene, preferably LDPE, which is both economical and readily available and thereby makes possible rational packing of the food on a large scale. In such instance, it is particularly preferred to pack the food in such a plastic package of the single layer type as is simple to produce, either from an extruded tubular plastic film, or from planar prefabricated plastic films by transverse and axial end sealings in a per se known manner by so-called heat sealing.

Fresh or untreated meat tends to deteriorate very quickly by the action of bacteria and other micro-organisms which either occur naturally in the meat and/or may come into contact with the meat while the meat is being prepared and during other handling operations. In order to minimize or preferably eliminate the presence of such quality-impairing bacteria and other micro-organisms, respectively, and thereby further to improve the preconditions for being able to pack the meat so that it has good shelf life, the meat is ideally exposed to a bacteria-reduction or -extermination treatment before and/or in connection with packing of the meat. Such bacteria-reduction treatments are known in the art and involve treatment by means of thermal action, irradiation etc. According to the present invention, an irradiation treatment is preferred of the type which exterminates at least the bacteria and micro-organisms present on the surface of the meat, but which, as opposed to thermal treatments, does not affect the other properties of the meat.

One preferred irradiation method that may advantageously be employed in connection with the method according to the present invention is the so-called "pulsed light" method which is based on the concept of subjecting the fresh meat to intensive, incoherent polychromatic light pulses or flashes within a wave length range of between 170 and 2,600 nanometres (nm) from one or more irradiation sources aimed at the meat. The "pulsed light" method is known to persons skilled in the art and is described, for example, in U.S. Pat. No. 4,871,559 which is hereby cited as reference.

Further practical and advantageous embodiments of the method according to the present invention have also been given the characterizing features as set forth in the appended subclaims.

DESCRIPTION OF PREFERRED EMBODIMENT

The present invention will now be described in greater detail hereinbelow, with the aid of one practical embodiment, according to which a food may be packed with good shelf life in a plastic package employing the method according to the invention.

The food which is to be packed may be any meat product whatsoever, but will, in the present non-restrictive Example, be assumed to be newly butchered fresh beef. The newly butchered meat is fed on a conveyor belt into a packing station comprising a packing machine of the type which forms, fills and seals packages at the same rate as the infeed rate of the conveyor belt. The packing machine produces such packages either from a tubular plastic film, preferably a single layer film of polyethylene, or from planar prefabricated plastic films, preferably single layer films of polyethylene, by repeated transverse and axial sealings in a per se known manner by so-called heat sealing, at the same time as the pieces of meat are enveloped in optional portion sizes in an oxygen gas atmosphere in the packaging spaces formed between transverse seals. After separation of the individual, closed packaging units by incisions in transverse sealing regions, the ready-filled and closed packages are discharged through the discharge end of the packing machine for further transport to retail outlets or other points of sale where the packed meat may be stored with good shelf life during storage times which are fully comparable with the shelf lives of conventional packages.

As has been pointed out earlier, the shelf life of the packed meat may be further prolonged if the meat is subjected to a bacteria-destruction irradiation treatment according to the known "pulsed light" method, according to which bacteria and other micro-organisms present on the surface of the meat are efficiently exterminated by means of brief, intensive, incoherent irradiation pulses or flashes of polychromatic light from one or more cooperating irradiation sources which the meat is caused to pass before, and/or in connection with being packed.

Thus, in the method according to the present invention, it is possible employing simple means and using already existing packaging technology, to pack foods, in particular meat, in such a manner that the packed meat may be stored with good shelf life during storage periods which are fully on a par with the prior art packaging technology according to the vacuum or MAP methods. Perhaps the greatest contribution of the present invention to the state of the art is that it makes possible the packing of such perishable and oxygen gas sensitive products with the aid of economical, readily available packaging materials such as polyethylene which is both economical and easily produced and which, moreover, possesses the valuable property that it may readily be sealed using a simple heat sealing technique which makes for the production of plastic packages with mechanically strong sealing joints on a rational industrial scale.

Naturally, in its broadest scope, the present invention is not restricted exclusively to the embodiment specifically described above, but encompasses variations and modifications obvious to a person skilled in the art, without departing from the inventive concept as defined in the appended Claims.

What is claimed is:

1. A method of extended shelf life packing of a food, wherein the food comprises meat, the method comprising packaging the food by sealing the food in a non-barrier, oxygen permeable, flexible package comprising plastic film wherein the atmosphere sealed within the package is pure oxygen (100% $O_2$).

2. The method an claimed in claim 1 wherein said plastic film comprises LDPE (low density polyethylene).

3. The method as claimed in claim 1 wherein said package is produced either from a tubular plastic film or from planar prefabricated plastic films by repeated transverse heat sealings, transversely of the longitudinal axis of the plastic film or plastic films, respectively, for the formation of closed packaging spaces for the food between such transverse sealings.

4. The method as claimed in claim 1 wherein said food is subjected to a bacteria-destruction treatment prior to and/or in connection with the packaging step.

5. The method as claimed in claim 4 wherein the bacteria destruction treatment of the food involves an irradiation treatment.

6. The method as claimed in claim 4 wherein said bacteria-destruction treatment of the food comprises subjecting said food to intensive, incoherent, brief irradiation pulses or flashes of polychromatic light within the wave length range of between 170 and 2,600 nanometers (nm) from one or more cooperating irradiation sources which are aimed at the food.

7. The method as claimed in claim 1 wherein said plastic film comprises polyethylene film.

* * * * *